June 5, 1951 R. N. G. ZEEGERS 2,555,667
PROCEDURES FOR THE PRODUCTION OF HYDROXYLAMINE COMPOUNDS
Filed Aug. 29, 1949 2 Sheets-Sheet 1

Inventor:
Rudolph N. G. Zeegers,
By Cushman, Darby & Cushman
Attorneys.

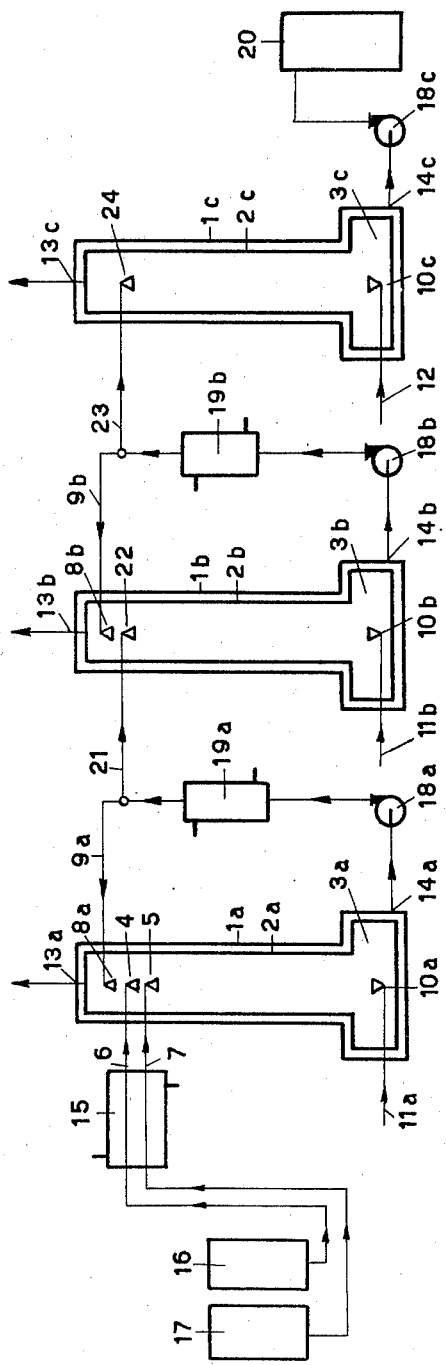

Patented June 5, 1951

2,555,667

UNITED STATES PATENT OFFICE 2,555,667

PROCEDURES FOR THE PRODUCTION OF HYDROXYLAMINE COMPOUNDS

Rudolph N. G. Zeegers, Beek, Netherlands, assignor to De Directie van de Staatsmijnen in Limburg, Heerlen, Netherlands Application August 29, 1949, Serial No. 112,863
In the Netherlands November 1, 1948

2 Claims. (Cl. 23—190)

This invention relates to procedures for the production of hydroxylamine compounds and, more particularly, it is concerned with a new process for the manufacture of hydroxylaminemonosulfonates, hydroxylaminesulfates or salts thereof by reaction of sulfur dioxide with nitrites and bisulfites.

FIELD OF INVENTION

According to the established procedure, hydroxylaminemonosulfonates are prepared by hydrolysis of the corresponding disulfonates, which are obtained by leading sulfur dioxide into a cooled aqueous solution of a nitrite, such as sodium nitrite, and a bisulfite, usually sodium bisulfite. Hydroxylaminesulfate can then be prepared by further hydrolysis of the hydroxylaminemonosulfonates at higher temperatures. The chemical reactions involved in this process are as follows:

$$NaNO_2 + NaHSO_3 + SO_2 \rightarrow NOH(SO_3Na)_2$$
$$NOH(SO_3Na)_2 + H_2O \rightarrow NHOH.SO_3Na + NaHSO_4$$
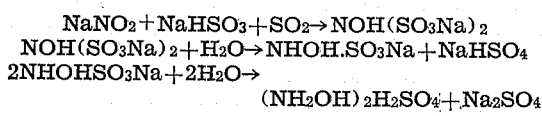
$$(NH_2OH)_2H_2SO_4 + Na_2SO_4$$

The reaction with sulfur dioxide must be carried out at low temperature, preferably at 0° C. or thereabout. At higher temperature, at 5° C. or above, a further reduction occurs to nitrilotrisulfonic acid, $N(SO_3H)_3$, which sulfonic acid is easily transformed by hydrolysis into imidodisulfonic acid, $NH(SO_3H)_2$. In order to prevent this undesired side-reaction, not only is the sulfur dioxide treatment carried out at a low temperature, but also the excess of sulfur dioxide must be removed from the solution at the low temperature, for example by means of a stream of air, before the reaction product may be exposed to higher temperatures. Furthermore, as is known, the treatment with sulfur dioxide usually is carried out with a small excess of bisulfite, in order to avoid the presence of unreacted nitrite, which in an acid medium at the end of the reaction would cause a decomposition of part of the hydroxylaminesulfonate already formed, which undesired reaction would proceed according to the equation:

For carrying out such procedures according to the prior methods, a reaction vessel isolated against heat is used which is provided with a stirrer and with cooling tubes, and further with a gas supply pipe at the bottom of the reaction vessel. In this reaction vessel a solution of sodium nitrite is mixed with a solution of sodium bisulfite at about 0° C. After the mixing sulfur dioxide is led into the solution, the temperature being kept at about 0° C. During the reaction the pH of the reaction mixture diminishes considerably from alkaline values at the start of the reaction, especially when a hydroxide is used, down to acid values of 3-4 at the completion of the sulfonate formation.

These prior methods of producing hydroxylamine compounds involve several known deficiencies which detract from the usefulness of the procedures and the reactions have been studied by numerous persons for quite a period of time to devise possible methods for their elimination. The deficiencies referred to include:

(A) Inability to carry out the process under most favorable pH conditions of the reaction mixture due to increasing acidity during reaction with sulfur dioxide.

(B) Very extensive stirring of solutions in the reactor are required to provide effective cooling of the reaction mixture and satisfactory gas liquid contact.

(C) Effective reaction between sulfur dioxide and the other reactants is difficult in cases where a gas which is low in sulfur dioxide content is used in the process.

(D) The process, of necessity, must be carried out by a batch operation.

An improvement on the general process has already been disclosed in the Dutch patent specification No. 59,910, according to which some of the said disadvantages, due to the increasing acidity during the reaction, may be avoided by carrying out the said process in two separate reaction vessels, in the first of which a partial reaction of the nitrite and the bisulfite with sulfur dioxide is effectuated at pH value within the range from 4–6, and subsequently the reaction mixture is led continuously into the second reaction vessel in which the reaction is completed at pH values lower than 2.5.

OBJECTS

A principal object of this invention is the provision of new improvements, comprising a combination of a new series of steps, in the procedures for the production of hydroxylaminesulfonates and sulfates. Further objects include:

(1) The provision of a method for effecting great savings in heat in carrying out the subject type of reaction.

(2) The provision of an increase in yield of desirable products based upon initial starting reactants with a concurrent reduction in formation of undesired by-products.

(3) The provision of a new method for controlling the pH of the reaction mixture for carrying out the subject type of process.

(4) The provision of new methods for conducting this type of action which eliminate the necessity of using stirring apparatus, at the same time providing more effective intermixing of process reactants.

(5) The provision of new methods for effecting the general reaction wherein even gases having low concentration of sulfur dioxide can be effectively employed.

(6) The provision of new procedures which eliminate any substantial losses of ammonia in those cases where an ammonium salt or compound is used as an initial reactant in the process.

(7) The provision of hydroxylaminesulfonate or sulfate compound manufacturing procedures which may be carried out in a continuous manner.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished in accordance with the present invention by a production procedure which essentially consists of four stages of operation. In the first stage, a cool aqueous solution of a nitrite, such as sodium nitrite, and a cool aqueous solution of a bisulfite, such as sodium bisulfite, are introduced into the top of a vertical reactor which is heat-insulated and, simultaneously, a flow of sulfur dioxide-containing gas is introduced streamwise into the reactor at the bottom so that the gas is allowed to flow upward through the reactor countercurrent with the down-flowing mixture of aqueous nitrite and bisulfite solutions. The liquid which flows to the bottom of the reactor is withdrawn, passed through a cooler and recycled back to the top of the reactor and again introduced for countercurrent flow with the up-flowing $SO_2$ gas. In the second stage, no new solution of nitrite or bisulfite is introduced and, instead, only recycled solution mixture withdrawn from the bottom of the reactor of the first stage is brought into countercurrent flow with further sulfur dioxide-containing gas. This recycle of solution mixture and $SO_2$ gas is continued until the nitrite present in the solution mixture is all reacted.

In the third stage, no sulfur dioxide gas is employed and the solution mixture withdrawn from the reactor of the second stage is recycled in the same or separate reactor for countercurrent flow with an inert gas, the solution mixture passing down through the vertical reactor and the inert gas passing up. This countercurrent flow of inert gas and solution mixture is continued until the $SO_2$ is dispelled from the solution mixture.

In the fourth stage, the solution mixture freed of $SO_2$ is allowed to stand in a suitable reactor with the temperature of the mixture raised above 5° C., so that the hydroxylaminedisulfonate in the mixture will hydrolyze into the corresponding hydroxylaminemonosulfonate and/or hydroxylaminesulfate.

The success of the present invention is due, to a large extent, to the discovery that the pH value of the reaction mixture in the process can be kept constant or held within narrow limits by adjusting the supply of initial materials in the first stage of the reaction. It has further been discovered that the action of sulfur dioxide in this general process gives unusually good results as to yield of hydroxylaminesulfonate, if the pH of the liquid is maintained within the range of 4.3 to 7.5 with the range 5.3 to 6.5 being superior, and a pH of 6.0 being preferred. The success of the invention is also due to the discovery that countercurrent flow of the $SO_2$ gas with only a portion of the bisulfite and nitrite reaction liquor, the remainder of the liquor being recycled through an external circuit, permits $SO_2$ gases, even of very low $SO_2$ content, to be effectively employed in the process.

DETAILED DESCRIPTION

Apparatus

A more complete understanding of the procedures of the present invention may be had by reference to the accompanying drawings in which:

Figure 2 is another form of apparatus which may be used for conducting the instant procedures, the apparatus of this figure being used for continuous operations.

Figure 1:
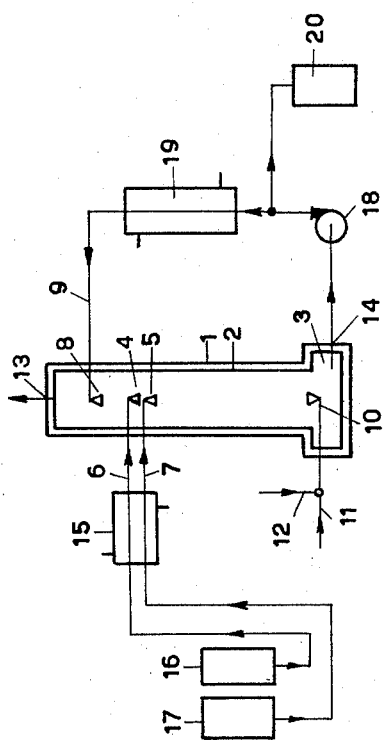
Figure 1 is a diagrammatic representation of one form of apparatus which may be employed in carrying out the process of this invention.

Referring in detail to the drawings, the apparatus consists of a vertical reactor 1, protected against heat by an isolated wall 2, and having an enlarged bottom part 3 for gathering the liquid flowing downward, the said reactor being supplied with spraying means 4 and 5 for the initial nitrite and bisulfite solutions, fed to the reactor by pipes 6 and 7 respectively, a spraying means 8 for the circulating liquid fed by the pipe 9, a gas inlet 10 for sulfur dioxide from the pipe 11 or alternatively for air from the pipe 12, an outlet 13 for the gas and an outlet 14 for the liquid; and moreover consisting of a cooler 15 for the nitrite taken from the tank 16 and for the bisulfite from the tank 17, and of a pump 18 for leading the liquid from the outlet 14 to the cooler 19 or alternatively to the hydrolysis tank 20.

In Figure 2, three reactors of the type as shown in Figure 1 are placed in succession, in order to carry out the stages of the process as hereinbefore described successively without interruption. The numbering of the parts of the apparatus is the same as in Figure 1 with the indications a, b or c relative to each of the three reactors respectively. In this continuous way of operation, a part of the liquid flowing from the cooler 19a in the first stage is fed by the pipe 21 to the inlet sprayer 22 in the second stage, and correspondingly the pipe 23 carries a part of the liquid flowing from the cooler 19b in the second stage to the inlet-sprayer 24 in the third stage.

In the first and second stages a gas-containing sulfur dioxide is fed to the gas inlet 10a and 10b respectively, whereas in the third stage air is fed to the inlet 10c. In the third stage no recycling of the liquid in the reactor is required, the excess of sulfur dioxide being removed by leading air through the liquid flowing downward in the reactor, the temperature thereby remaining sufficiently low for avoiding undesirable side reactions.

Process

The reaction with sulfur dioxide proceeds in a satisfactory way when the temperature of the reaction mixture is maintained below 2° C., preferably near 0° C., or therebelow. Due to the exothermic character of the said reaction, the methods hitherto employed cooling means of high capacity and the reaction mixture had to be stirred intensively, whereas, in the process according to this invention, the heat of the reaction is carried away by the circulating liquid, whereby the temperature in the reactor easily can be kept within a narrow range, or even substantially constant at 0° C., by cooling the circulating liquid in any suitable type of cooler, as commonly used in practice, the temperature of the cooling medium in the said cooler being adjusted within the range from —10 to —20° C. Moreover, the initial solutions of the nitrite and of the bisulfite may also be cooled to about the reaction temperature before leading the same into the reactor, by use of the cooling medium flowing from the cooling system in which the circulating liquid is cooled.

In the second stage of the instant process, the formation of hydroxylaminedisulfonate is completed after cutting off the feed of the initial nitrite and bisulfite solutions. In this stage of the process, the acidity of the reaction mixture is gradually increased by the continued introduction of sulfur dioxide to a pH value within the range from 3 to 4. The temperature conditions in this second stage are substantially the same as in the former stage. The temperature in this stage is held to 0°±5° C.

In the third stage of the process, also substantially the same temperature conditions are maintained during the removal of the excess of sulfur dioxide in order to avoid a decomposition of the hydroxylaminedisulfonate, which would occur in the event that the temperature rises to 5° C. or above, still in the presence of sulfur dioxide. The pH in this stage is about 3 to 4.

In the fourth stage of this process, no special provisions as to the cooling of the hydroxylaminedisulfonate solution are required. The hydrolysis of hydroxylaminedisulfonate proceeds within about one day by maintaining the liquid taken from the reactor at room temperature. The said hydrolysis may also be carried out at higher temperatures of about 50° C., in which case the reaction is practically completed within about thirty minutes, whereas at even higher temperatures, for example 75° C., only a few minutes are required for the hydrolysis. As is known, when carrying out the hydrolysis at the said high temperatures, or at still higher temperatures, instead of hydroxylaminemonosulfonate, hydroxylaminesulfate may be obtained.

MODIFICATIONS AND EQUIVALENTS

A variety of reagents may be employed as the bisulfite-providing material for the process. Sodium bisulfite is preferred, but other alkali-metal or alkaline-earth-metal or ammonium bisulfites may be used. Likewise, the hydroxide of said metals or ammonia may be used as well as the salts of said metals or ammonia from which a bisulfite is obtained when an aqueous solution of the salt is contacted with sulfur dioxide.

Numerous materials can be used as a source of the nitrite for the process, sodium nitrite being preferred. Other usable materials include other alkali-metal, alkaline-earth-metal or ammonium nitrites.

As has been indicated, although pure sulfur dioxide is readily used in the process, it is particularly noteworthy because even gases which are rather poor in sulfur dioxide, such as gases from roasting processes of ores containing sulfur, may be very effectively employed.

According to other modifications of the present process, not shown in the figures referred to above, the reaction conditions may be properly adjusted by employing more than one inlet for some or all of the initial materials. For example, the nitrite solution may be fed into the reactor at several places at the same or different distance from the bottom thereof, which may also be done with the bisulfite solution and/or the gases containing sulfur dioxide, as well as with the recycling liquid. Thereby initial solutions of different concentration may be fed at different places, and also solutions of different initial compounds may be used. Furthermore, gases with a different content of sulfur dioxide may be fed into the reactor at different places. A similar system of different inlet places may be applied to one or more of the reactors in the continuous process described above with reference to Figure 2.

In order to avoid side reactions the nitrite and the bisulfite are advantageously fed into the reactor separately. However, in the event of employing as the bisulfite, a salt or hydroxide yielding a bisulfite by the action of sulfur dioxide, as stated above, a mixing with the nitrite may occur before feeding the solutions into the reactor.

To the benefit of a good contact of the liquid with the gas, the solutions of the initial materials as well as the circulating liquid may be fed into the reactor by means of sprayers or any other suitable means by which a finely divided state is obtained. In the event of an ammonium compound being used as one of the initial materials, the said sprayer or other means for the feed of said ammonium compound is preferably placed below the inlet of the circulating liquid, in order to avoid losses of ammonia. Furthermore, the reactor may be filled up in any known manner with suitable solid bodies such as rings, blocks and the like.

Example

In the apparatus as shown in Figure 2 an aqueous solution of 18.3 per cent by weight ammonium nitrite and 10.3 per cent by weight of ammonium hydroxide is fed to the first reactor in countercurrent with a roasting gas containing 8 per cent by volume of sulfur dioxide. The temperature is maintained at about 0° C. by cooling of the circulating reaction liquid. The pH of the liquid in the first reactor is maintained within the range from 6.0–6.2 by regulating the velocity of the roasting gas.

About one quarter of the liquid is passed into the second reactor at the bottom of which also roasting gas is supplied in an amount so as to maintain the pH value of the liquid in the second reactor within the range from 3.0–3.5. The temperature in the second reactor is maintained at about 0° C.

Again about one quarter of the reaction liquid after leaving the second reactor is passed into the third reactor and is treated therein in countercurrent with air fed at the bottom of this reactor. The liquid leaving the third reactor contains hydroxylaminedisulfonate in a yield of 88.4% and is fed to a tank wherein it is allowed to stand at atmospheric temperature.

I claim:

1. A process for the production of a hydroxylamine compound from the group consisting of hydroxylaminemonosulfonate, hydroxylaminesulfate and salts thereof which comprises in a first stage, mixing a stream of a cooled aqueous solution of a nitrite from the group consisting of alkali-metal, alkaline-earth-metal and ammonium nitrites with a stream of a cooled aqueous solution of a bisulfite-providing material from the group consisting of alkali-metal, alkaline-earth-metal and ammonium bisulfites, hydroxides, and salts which react with sulfur dioxide to form bisulfites, flowing the solution mixture into countercurrent contact with a stream of sulfur dioxide gas, withdrawing a stream of the solution mixture from contact with the $SO_2$ gas stream, cooling the withdrawn stream, recycling the withdrawn, cooled stream into countercurrent contact with the $SO_2$ gas stream, in a second stage, discontinuing the introduction of new solution mixture, continuing the recycling and countercurrent flow of the already introduced solution mixture with an $SO_2$ gas stream until all the nitrite present in the solution mixture is reacted, in a third stage, flowing the solution mixture in countercurrent flow with an inert gas stream until $SO_2$ is dispelled from the solution mixture, and in a fourth stage, discontinuing the flow of inert gas stream, heating the solution mixture to a temperature above 5° C., and allowing the reaction product formed in the solution mixture to hydrolyze into said hydroxylamine compound.

2. A process as claimed in claim 1 wherein the pH of the solution mixture is between 4.3 and 7.5 in said first stage.

RUDOLPH N. G. ZEEGERS.

REFERENCES CITED

The following references are of record in the file of this patent:

UNITED STATES PATENTS

| Number | Name | Date |
|---|---|---|
| 1,010,177 | Raschig | Nov. 28, 1911 |

FOREIGN PATENTS

| Number | Country | Date |
|---|---|---|
| 3,028 | Great Britain | Feb. 26, 1887 |